US006636247B1

(12) United States Patent
Hamzy et al.

(10) Patent No.: US 6,636,247 B1
(45) Date of Patent: Oct. 21, 2003

(54) MODALITY ADVERTISEMENT VIEWING SYSTEM AND METHOD

(75) Inventors: Mark J. Hamzy, Round Rock, TX (US); Michael R. Cooper, Austin, TX (US); Mark W. Vanderwiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,875

(22) Filed: Jan. 31, 2000

(51) Int. Cl.[7] .................. G06F 3/00; G06F 17/30; G06F 17/60
(52) U.S. Cl. .................. 345/808; 345/805; 345/962; 705/14
(58) Field of Search ................. 345/733, 738, 345/741, 760, 764, 809, 835, 840, 854, 962, 805, 808; 434/322, 323, 327, 335; 707/501.1, 513; 715/501.1, 513; 705/14

(56) References Cited

U.S. PATENT DOCUMENTS

| | | | | |
|---|---|---|---|---|
| 5,737,533 A | * | 4/1998 | de Hond ................. | 709/219 |
| 5,737,619 A | | 4/1998 | Judson ................... | 715/500 |
| 5,740,549 A | | 4/1998 | Reilly et al. ............ | 705/14 |
| 5,794,210 A | | 8/1998 | Goldhaber et al. ...... | 705/14 |
| 5,838,790 A | | 11/1998 | McAuliffe et al. ...... | 713/176 |
| 5,860,073 A | * | 1/1999 | Ferrel et al. ............ | 707/522 |
| 5,990,890 A | * | 11/1999 | Etheredge ............... | 345/808 |
| 6,006,252 A | * | 12/1999 | Wolfe .................... | 709/203 |
| 6,023,270 A | * | 2/2000 | Brush et al. ............ | 345/741 |
| 6,102,406 A | * | 8/2000 | Miles et al. ............. | 273/430 |
| 6,335,744 B1 | * | 1/2002 | Korilis et al. ........... | 345/835 |
| 6,457,025 B2 | * | 9/2002 | Judson ................... | 707/501.1 |

FOREIGN PATENT DOCUMENTS

WO     00/39710    * 7/2000    ........... G06F/17/30

OTHER PUBLICATIONS

Ed Foster, "Junk–e–mail: it's not only annoying, it can cost you time and money," May 6, 1996, InfoWorld, v18, n19, p58 (1).*
"Net–mercial.com Partners With GEO Interactive to Deliver Dynamic Audio/Video Internet Advertising Solutions," Aug. 18, 1999, PR Newswire, p2239.*

* cited by examiner

*Primary Examiner*—John Cabeca
*Assistant Examiner*—X. L. Bautista
(74) *Attorney, Agent, or Firm*—Duke W. Yee; Jeffrey S. LaBaw (57) ABSTRACT

A system and method for extending a display of advertisements on a client web browser as provided. The method includes a response to a request for a web page presenting an advertisement associated with a web page and randomly embedding a control for proceeding to the web page in the display of the advertisement. Upon presenting the advertisement for display, a randomly displayed feature must be activated by the user. Thereupon in response to the user activation of the control, the advertisement is deleted and the display proceeds to the requested web page, thereby displaying advertisements for extended viewing by a user.

20 Claims, 7 Drawing Sheets

MODALITY ADVERTISEMENT VIEWING SYSTEM AND METHOD

BACKGROUND OF THE INVENTION

1. Technical Field

The present invention relates generally to the display of advertisements on computer networks and more particularly to methods for extending viewing time of advertisements on a client browser operating in a distributed server computer environment.

2. Description of the Related Art

The use of advertising revenues to pay for information dissemination is well established in domains such as television and radio in which end users are tuned to a continuous signal over a lengthy period of time. In such systems, due to the continuous nature of the signal being monitored by the end users, the end users are sufficiently similar to a "captive audience" that many or most end users remain tuned to the same signal even when the main program to which they are listening or viewing is interrupted by advertisements. Another example of advertising mixed with information dissemination is the use of scrolled text at the bottom of a television or computer screen where the main program occupies most of the end users visual field and a smaller portion is occupied by advertisements and the like on a scroll bar or similar visual device along the periphery of the screen. In some contexts, such as cable television channels that display a stock ticker tape, this relationship is reversed; the information portion of the screen occupies a small part of the screen, such as horizontally scrolling image region at the top or bottom of the display and the remainder of the screen is occupied by advertisements, infomercial, and the like.

Up until the present, distributing information by the Internet or other publicly accessible computer communication networks has been largely unsupported by advertising revenues due to the lack of good mechanisms for mixing advertising and information content in such a way as to be acceptable to both end users and advertisers.

The Internet is a network of computers which contains the world wide web (WWW), as well as other functions such as e-mail. Since the introduction of the WWW, there has been an explosion of growth in the usage of the Internet. Much of this growth has been fueled by the introduction and widespread use of so-called web browsers which allow for a simple graphical user interface based access to network servers which support documents formatted as so-called web pages. The World Wide Web (WWW) is that collection of servers of the Internet that utilize the Hypertext Transfer Protocol (HTTP). HTTP is a known application protocol that provides users access to files (which can be in different formats such as text, graphics, images, sound, video, etc.) Using a standard page description language known as Hypertext Markup Language (HTML). HTML provides basic document formatting and allows the developer to specify "links" to other servers and files. Use of an HTML-compliant client browser involves specification of a link via a Uniform Resource Locator or "URL". Upon such specification, the client makes a TCP/IP request to the server identified in the link and receives a web page, namely, a document formatted according to HTML, in return.

The present invention addresses a problem prevalent in electronic information distribution systems. In particular, "on line" users often bypass advertisements by hitting a specific button or a control sequence such as Alt-F4 to bypass an advertisement. Most advertisers would like to extend the time period that their advertisement is before the viewing audience. Some companies offer free email or even Internet access in exchange for viewing advertisements. It is important that the viewer cannot easily tune out or ignore the ads. It would be easy for viewers to ignore banner or scrolling ticker tape advertisements. The present invention addresses this concern.

SUMMARY OF THE INVENTION

The present invention provides a system and method for displaying advertisements on the Internet in response to requests for Internet information from a specific website. In response to a request for a specific information available on the web, an advertisement associated with that web page is retrieved and displayed to the user. Within the display of the advertisement is embedded a randomly placed control function for proceeding from the advertisement to the web page of interest. Once the randomly placed control is activated by the user, the user requested information is displayed.

The random or non-predictive control function can be the placement of buttons within the advertisement display. The control function can be a control key randomly placed within the advertisement. Another control function is asking a question that must be answered before proceeding to the web page of interest. A further control function according to the invention is to display the advertisement which is correlated to the particular web page for a predetermined time period before transferring the window containing the content or web page the user has selected.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE PREFERRED EMBODIMENT

Figure 1:
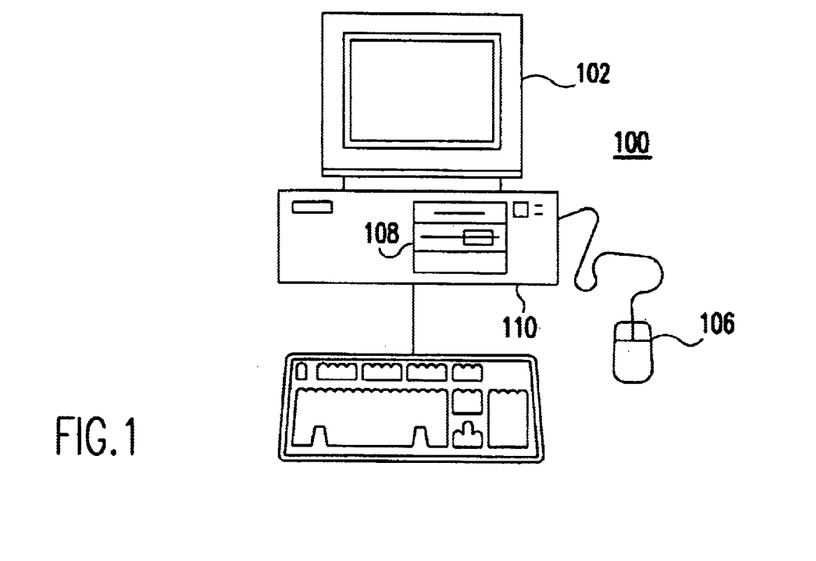
FIG. 1 is a pictorial representation depicting a data processing system in which the present invention may be implemented in accordance with a preferred embodiment of the present invention.

Referring now to FIG. 1, there is a pictorial representation which depicts a data processing system in which the present invention may be implemented. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International business Machines Corporation, located in Armonk, N.Y. Although the depicted representation shows a personal computer, other embodiments of the present invention may be implemented in other types of data processing systems, such as network computers, Web-based television set top boxes, Internet appliances, etc. Computer 100 also preferably includes a graphical user interface that may be implemented by means of systems software residing in computer readable media in operation within computer 100.

Figure 2:
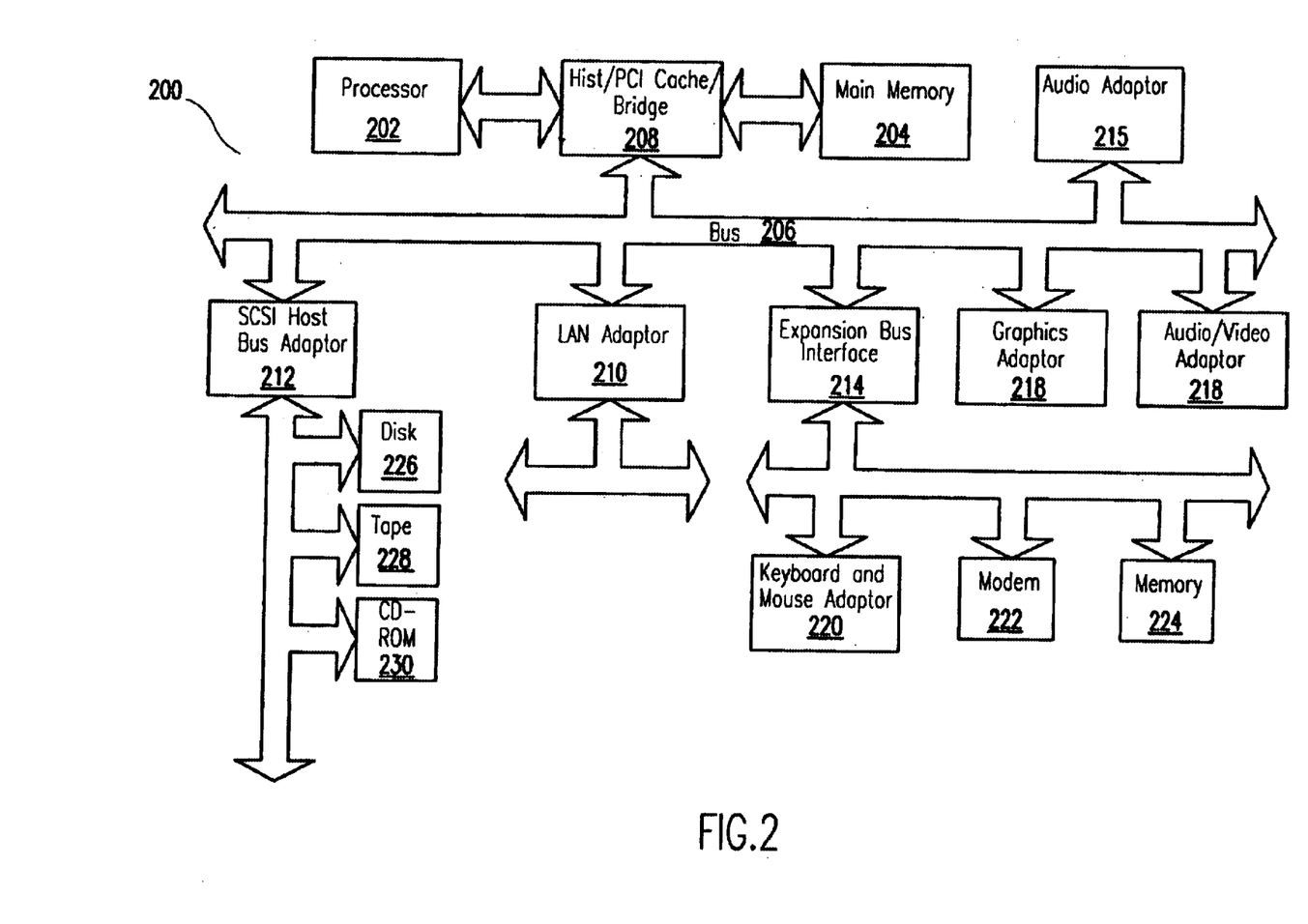
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 22B, and CD-ROM 230. In that case, the computer, to be properly called a client to computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

Figure 3:
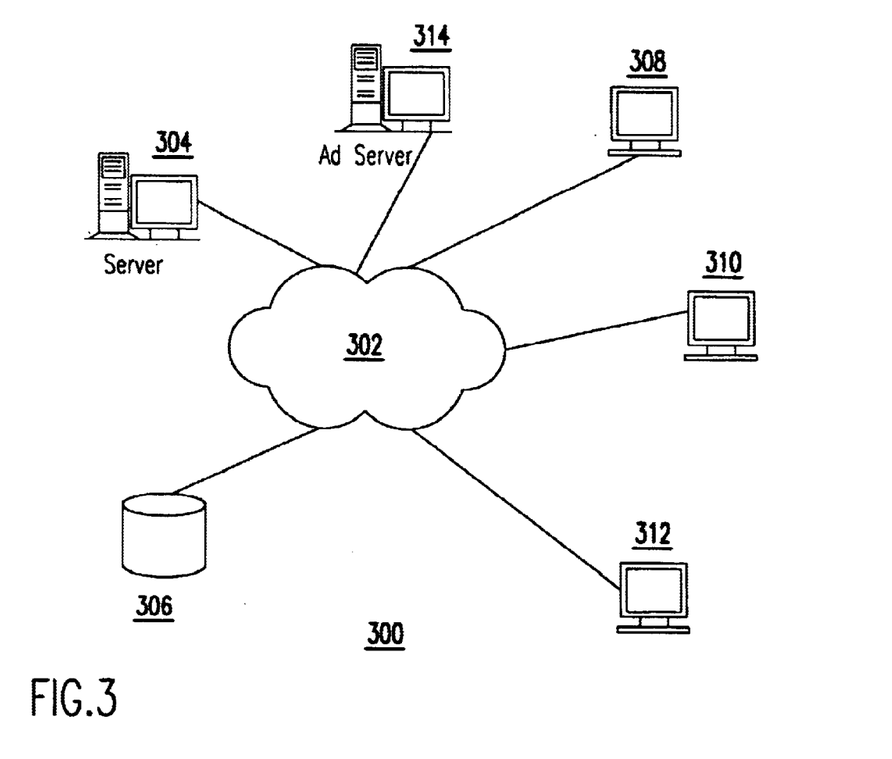
FIG. 3 is a block diagram depicting a pictorial representation of a distributed data processing system in which the present invention may be implemented.

With reference now to FIG. 3, a block diagram depicts a pictorial representation of a distributed data processing system in which the present invention may be implemented. Distributed data processing system 300 is a network of computers in which the present invention may be implemented. Distributed data processing system 300 contains a network 302, which is the medium used to provide communications links between various devices and computers connected together within distributed data processing system 300. Network 302 may include permanent connections, such as wire or fiber optic cables, temporary connections made through telephone connections or networks which employ wireless technology.

In the depicted example, a server 304 is connected to network 302 along with storage unit 306. In addition, clients 308, 310, and 312 also are connected to a network 302. These clients 308, 310, and 312 may be, for example, personal computers or network computers. For purposes of this application, a network computer is any computer, coupled to a network, which receives a program or other application from another computer coupled to the network. In the depicted example, server 304 provides data, such as boot files, operating system images, and applications to clients 308–312. Clients 308, 310, and 312 are clients to server 304. Distributed data processing system 300 may include additional servers, such as advertisement server 314, which places advertisements to a user in response to a request. Other peripheral devices may be attached to the network such as clients, and other devices not shown. In the depicted example, distributed data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 300 also may be implemented as a number of different types of networks, such as, for example, an intranet, a local area network (LAN), or a wide area network (WAN). FIG. 3 is intended as an example, and not as an architectural limitation for the present invention.

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients affect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources, usually identified by a Uniform Resource Locator (URL). A URL is a special syntax identifier defining a communications path to specific information. Each logical block of information accessible to a client, called a "page" or a "Web page", is identified by a URL.

The URL provides a universal, consistent method for finding and accessing this information, not necessarily for the user, but mostly for the user's Web "browser". A browser is a software application for requesting and receiving content from the Internet or World Wide Web. Usually, a browser at a client machine, such as client 308 or data processing system 200, submits a request for information identified by a URL. Retrieval of information on the Web is generally accomplished with an HTML-compatible browser. The Internet also is widely used to transfer applications to users using browsers. With respect to commerce on the Web, consumers and businesses use the Web to purchase various goods and services solely on the Web while others use the Web to extend their reach. Information about the World Wide Web can be found at the Web site of the World Wide Web Consortium.

Figure 4:
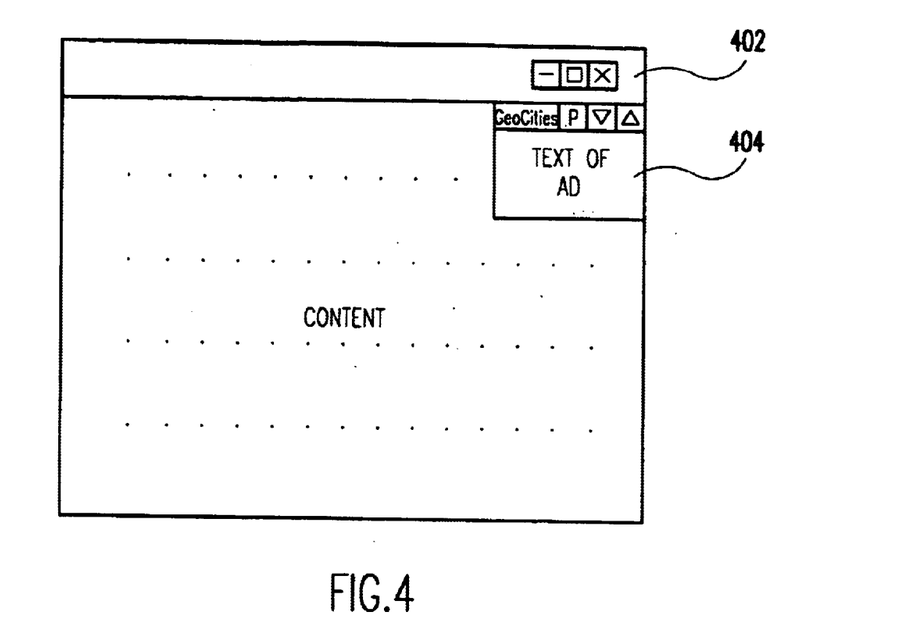
FIG. 4 is a block diagram of the prior art showing a browser window that only contains an advertisement.

Most advertisements on the Web, while annoying, are easy to ignore. Shown in FIG. 4 is a typical desktop view 400 of a client screen. A title bar 402 includes ways to close or minimize the current screen. Alternatively striking Alt-F4 would close a Windows-based format view. A separate browser window is opened which contains only the advertisement 404 which presents information to the user who may cancel the advertisement by moving the mouse cursor to the title bar to minimize or delete the advertisement or use Alt F4 to close the window. The user need not look at the advertisement and simply close the window.

Figure 5:
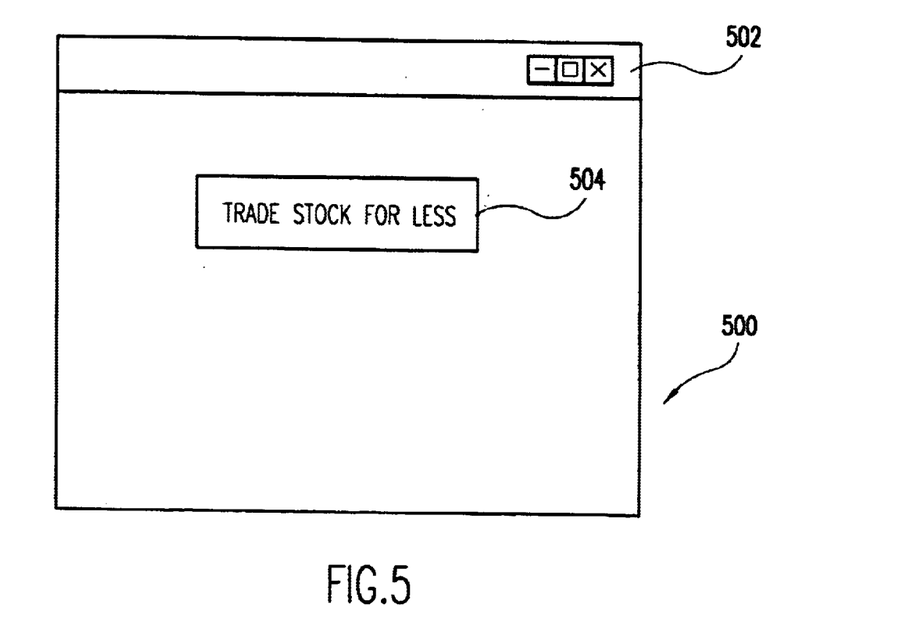
FIG. 5 is another block diagram of the prior art showing an advertisement placed in a standard location.

Another typical advertisement is a banner ad 504 shown in FIG. 5, which has a desktop screen 500 having a title bar 502. The banner ad 504, is usually unobtrusive in that it does not block the user from reading the web page. A further conventional advertisement, sometimes referred to as a dual box, is displayed over a portion of the content of the web page. The dual box ad has control features which allow a user to enlarge or minimize the display but typically the display cannot be completely removed by the user. Yet a further conventional Internet advertisement structure is the display of an advertisement over substantially the entire display area in response to a URL from a user. The advertisement contains an embedded control, present at the same location on the page regardless of the advertisement content, which requires a user to "click through" the control in order to reach the display of the desired web page. In each of the foregoing prior art advertisement architectures, the location of the banner ad, dual box ad or other advertisement is relatively easy to bypass on the way to a desired URL because the location of the control is predictable and can therefore be anticipated by the user.

Figure 6:
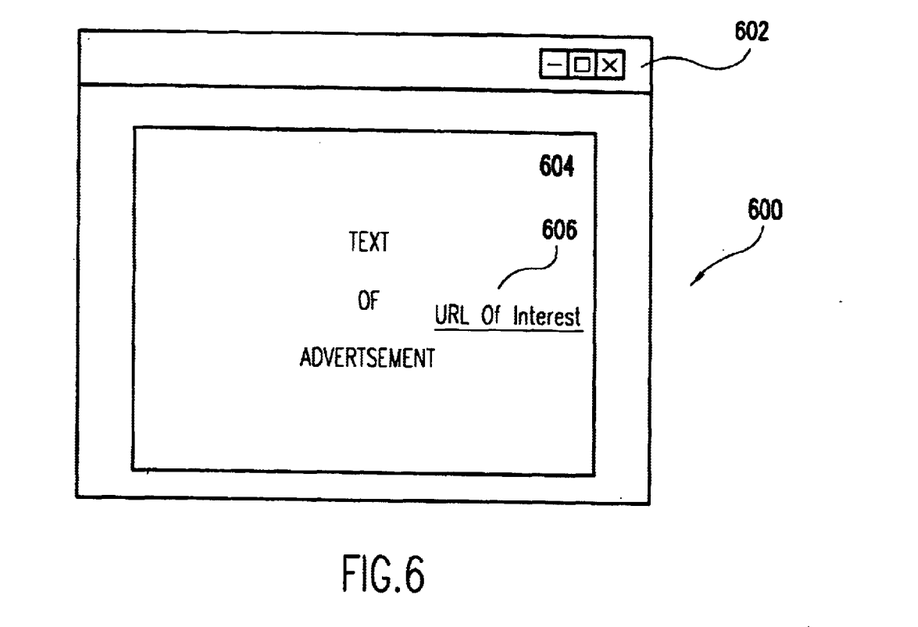
FIG. 6 is a block diagram of the present invention showing the random placement of a control key within an advertisement.

The present invention is directed at methods to increase the display time of advertisements associated with a particular URL. In a first embodiment of the invention, the hyperlink to proceed to the desired page is randomly located within each consecutive advertisement that is presented to the user. An example of this method is shown in FIG. 6 where the desktop 600 having a title bar 602 has shown a display 604 containing a full screen advertisement for viewing by the client user. Contained within the advertisement is the URL of interest 606, which must be clicked on in order to proceed. The placement of the URL within the advertisement display is presented at random locations within the advertisement and consequently the locations will vary with each advertisement display. For the purposes of the application random is defined as difficult to predict. An example of a program for implementing the sending of a randomly placed link in the advertisement text is set forth in the following sequence of steps:

1. Send the header;
2. Elect which type of placement method which will be used. Some examples include words, sentences, or paragraphs;
3. Count the number of words sentences or paragraph within the advertisement text;
4. Select a random number between 1 and the number which is generated from step 3;
5. Output the advertisement counting until the random number is reached;
6. Output the next page URL. There are a number of ways to implement this step. One manner is to add an anchor tag around the word.
7. Output the rest of the advertisement;
8. Output the footer.

Figure 7:
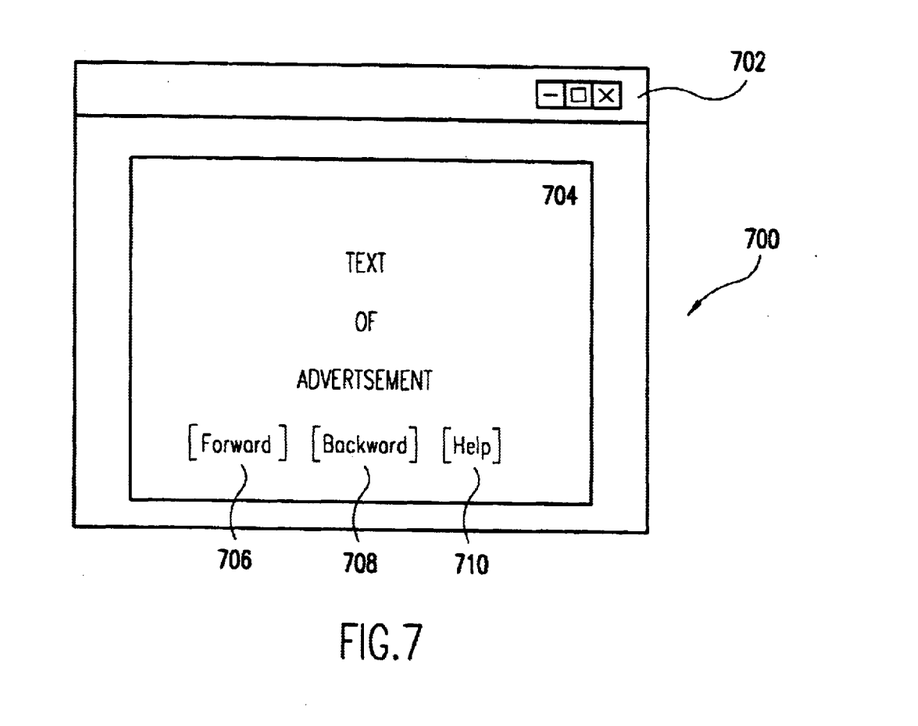
FIG. 7 is a showing of the present invention having a control key placed in the advertisement that can be in a random location.

Another method of extending the viewing time of advertisements is shown in FIG. 7. Again herein is shown a desktop 700, and title bar 702. The text of an advertisement is shown as a full screen view, 704. Placed somewhere on the advertisement presentation 704 are a series of buttons for proceeding. The buttons represent a location which contains the control function to proceed to the desired web page, proceed back to the previous web page or proceed to a third web page providing information relevant to information presented on the button For example, the buttons "forward", 706, "backward", 708 and "more info" 710 are placed on the screen is a random order whenever the Web advertisement is shown where forward 706 is linked to the desired web page, backward 708 is linked to the previous page and "more info" is linked to a page with additional information relating tot he displayed advertisement. The placement of the buttons can also be randomly placed on screen 704. More than three buttons may be used or fewer than three buttons may be used. By making the display of the location and control function of the buttons random, a user cannot anticipate the control necessary to remove the ad and consequently the advertisement may be displayed for a longer duration.

A program for implementing the sending of random buttons is as follows:

1) Send the header;
2) Pick an advertisement at random and insert it into the stream;
3) Generate and send three buttons;
4) Send footer.

The next page can either be the same name always or a randomly generated name.

Figure 8:
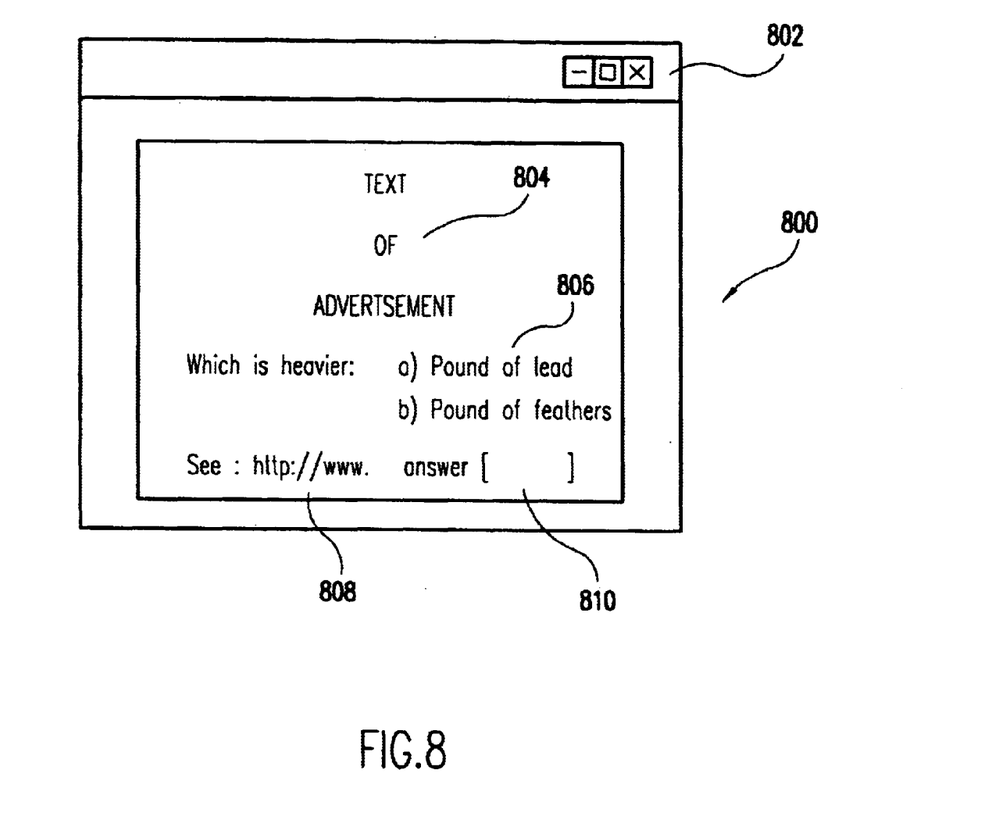
FIG. 8 is a showing of the present invention having a quiz based feature.

Another method to extend advertisement viewing is to display the advertisement with a question and give a number of URLs where the answer is hidden. This is shown in FIG. 8, wherein desktop 800, contains title bar 802, and has displayed a full screen advertisement 804. A question 806 is asked. Suggested locations to find the answers 808 is given. With the place for the answer 810 shown. The user will not be able to proceed without giving the correct answer. Alternatively, the text of the advertisement may be displayed and a question about the text must be answered before proceeding.

Yet a further method to extend the display time of an advertisement is to display the advertisement for a predetermined time period before allowing the web page which has been requested to be accessed by the user. In a contemplated embodiment the control function which allows the user to proceed is disabled for a predetermined time. In another contemplated embodiment the display is automatically advanced from the advertisement to the selected web page after the predetermined time has elapsed. The predetermined time period which is selected may be randomly set with respect to each advertisement. In preferred embodiments which employ time as a control function the user is provided with a display which conveys information relating to the time which is remaining before the before the selected web page will be displayed or the control function is activated. Such a display may take the form of a timer with a moving hand progressing toward zero, or a bar graph "filing up" at a constant rate.

Figure 9:
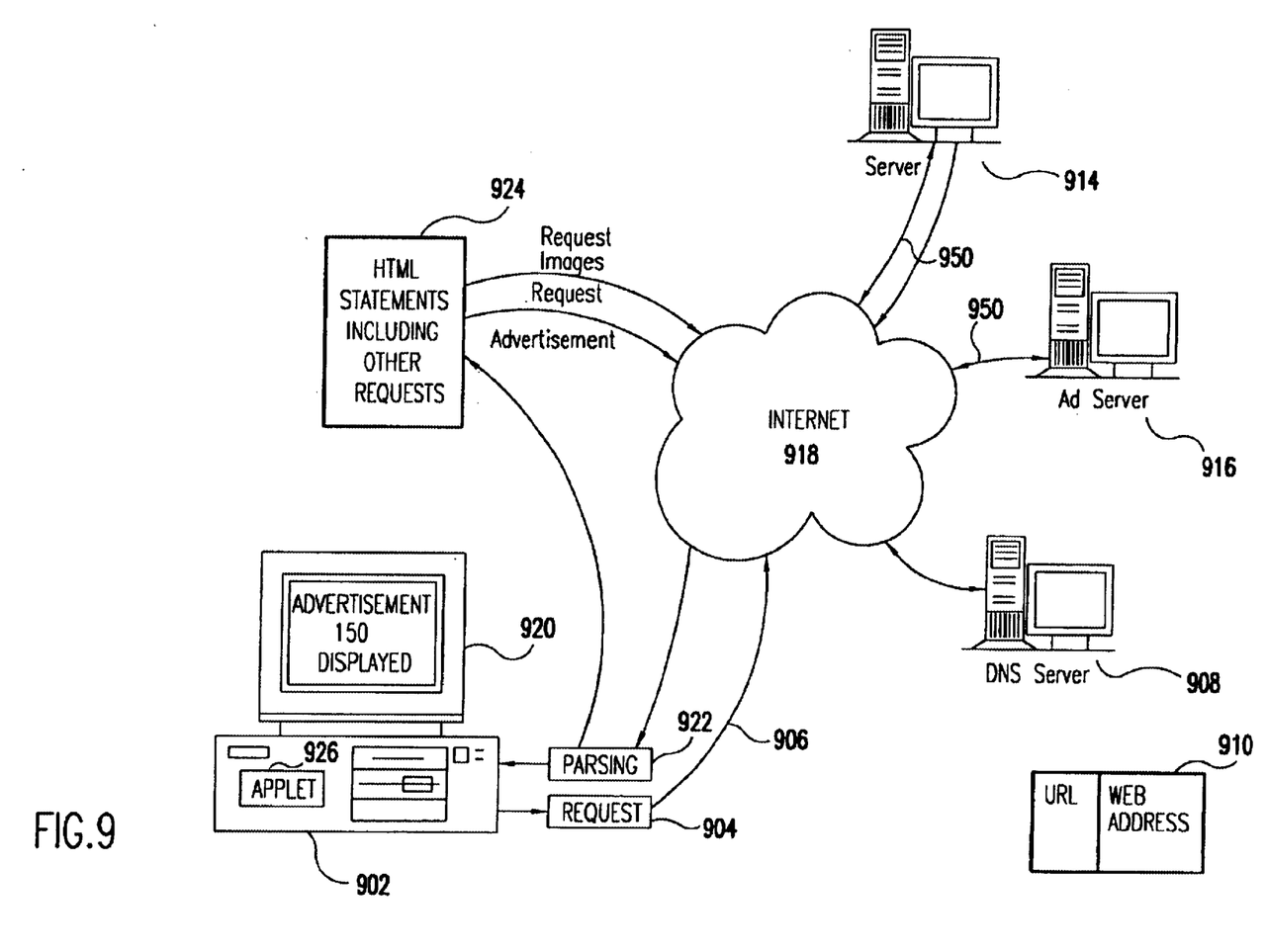
FIG. 9 is a flow chart of a step sequence of the present invention.

As shown in FIG. 9, a client computer 902, makes a request for a specific URL 904. The URL is parsed into component parts to identify the type of request, the server name sent to the DNS, and the path of the html file. The path is sent to the web server as part of the HTTP GET line for getting and posting a requested address. The DNS 908, resolves the URL to a corresponding Internet Protocol address 910. The request 912 is routed from DNS 908 to correct server 914 for fulfillment of the request. Associated with the URL is an advertisement 950. The advertisement 950 can be on requested server 914, or alternatively the advertisement could reside on a separate advertisement server 916.

The requested information is sent over the Internet 918 along with the advertisement 950 in the form of hypertext markup language (HTML). This is presented to the video monitor 920 of the client computer 902. A browser 922 parses the received information for content and formatting. Statements of other requests and images are made to the server via HTML 924. An applet 926, running on the client computer or on a server on the Internet may be run to place the advertisement and only the advertisement on the host computer's screen and to implement the various options for extending the advertisement viewing time. The applet parses the page and sizes it for display. The applet 926 of FIG. 9 can be used to select and implement the control function within the advertisement. This function can vary over time or preselected based on the type of advertisement. A timer function is a feature of the HTML programming language and this can be used for the timer control function. A control feature may be implemented to disable the delete function of the title bar or the "alt F4" function while an advertisement is on display.

Figure 10:
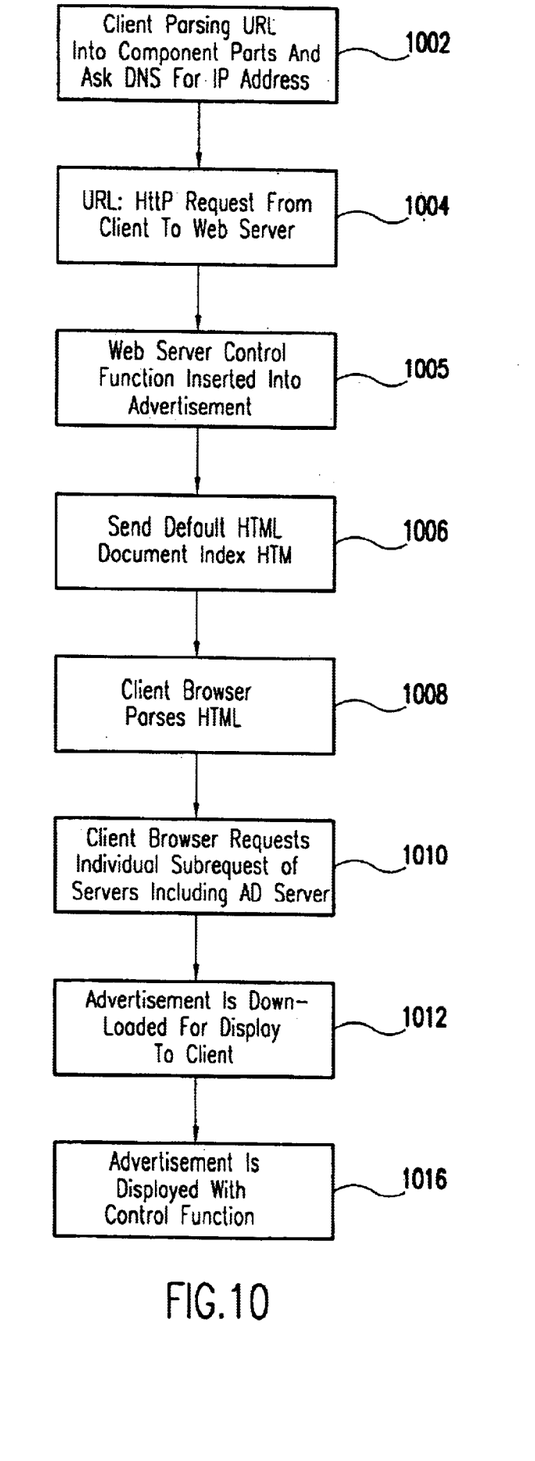
FIG. 10 is a flow chart of an alternative embodiment of the present invention for displaying advertisements to a viewer for an extended period of time.

A flow chart of the method for implementing the invention is shown in FIG. 10. In step 1002, a request is generated at the client computer for accessing a web page. Also, in step 1002 the host name within the URL is received by the domain name server (DNS) translating the host name into a server EP address. In step 1004, the web server receives the HTTP request from the client. In step 1005 one of the control functions described above is added to the advertisement prior to the servers sending the requested information to the user. In step 1006 the server corresponding to the IP address sends down a default HTML document named index.htm including HTML programming code. In step 1008 the browser at the client computer parses the HTML code into unique server file requests. In step 1010, based on information in the unique server file requests, the browser then requests subrequests of files from servers including an advertisement server. The advertisement is downloaded for display in step 1012. With the control function inserted into the advertisement, the advertisement is displayed to the user in step 1016.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles often invention, the practical application, and to enable others of ordinary skill in the art to understand the invention for various embodiments with various modifications as are suited to the particular use contemplated.

What is claimed is:

1. A method for advertising on the Internet, comprising the steps of:
   responsive to a request for a web page, retrieving an advertisement associated with said requested web page;
   randomly embedding a control function feature within said advertisement for proceeding to said requested web page;
   presenting the advertisement on a display; and
   responsive to user activation of said control function, proceeding to said requested web page.

2. The method as recited in claim 1, wherein said random embedding of said control function is a random location within said advertisement.

3. The method as recited in claim 1, wherein the appearance of said control function varies between requests.

4. The method as recited in claim 1, wherein the wording of said control function which enables the user to proceed to said requested web page varies between requests.

5. The method as recited in claim 1, wherein the size of said control function varies between requests.

6. The method as recited in claim 1, wherein said control function is a plurality of buttons placed within said advertisement on display.

7. The method as recited in claim 1, wherein said control function further comprises a question, a plurality of incorrect answer selections, and a correct answer selection and said correct answer selection must be selected to proceed to said requested web page.

8. The method as recited in claim 1, wherein a random feature of the control function is the time period that said advertisement is displayed.

9. The method as recited in claim 1, wherein said advertisement is retrieved from a proxy server.

10. A method for advertising on the Internet, comprising the steps of:

responsive to a request for a web page, retrieving an advertisement associated with the web page;

embedding a control function feature within said advertisement for proceeding to the web page which is enabled after the display of said advertisement after a predetermined time;

presenting the advertisement on a display; and responsive to the expiration of said predetermined time, enabling of said control function, and proceeding to the requested web page.

11. The method as recited in claim 10 wherein, after the enablement of said control function, said control function is activated by the user.

12. The method as recited in claim 10 wherein after the control function is enabled, the control function automatically activated wherein said requested page is displayed after the expiration of said advertisement.

13. A system for advertising on the Internet, comprising:

means responsive to a requested web page for retrieving an advertisement associated with said requested web page;

means for non-predictively embedding a control function in said advertisement for proceeding to said requested web page;

means for presenting said advertisement on a display; and means responsive to user activation of said control function, proceeding to said web page.

14. The system as recited in claim 13, wherein the location of said control function varies between requests.

15. The system as recited in claim 13, wherein the appearance of said control function varies between requests.

16. The system as recited in claim 13, wherein the size of the control function varies between requests.

17. The system as recited in claim 13, wherein said control function is a plurality of buttons placed within said advertisement on said display.

18. The system as recited in claim 13, wherein said control function is a questions that must be answered before proceeding to said requested web page.

19. A computer program product in a computer readable medium for displaying advertisements on the Internet, comprising:

means responsive to a request for a web page, for retrieving an advertisement associated with the web page;

means for non-predictively embedding a control in the advertisement for proceeding to the web page;

means for presenting the advertisement on a display; and means responsive to user activation of the control function for proceeding to said requested web page.

20. The product recited in claim 19, which further comprises:

means for providing an advertisement with a web page from a proxy server.

* * * * *